United States Patent
Suh (10) Patent No.: US 7,599,266 B2
(45) Date of Patent: Oct. 6, 2009

(54) MULTI-LAYERED RECORDING MEDIUM, AND METHOD AND APPARATUS FOR RECORDING DATA

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 11/477,556

(22) Filed: Jun. 30, 2006

(65) Prior Publication Data

US 2007/0002483 A1 Jan. 4, 2007

Related U.S. Application Data

(60) Provisional application No. 60/695,006, filed on Jun. 30, 2005.

(30) Foreign Application Priority Data

Nov. 2, 2005 (KR) .................... 10-2005-0104345

(51) Int. Cl.
*G11B 7/00* (2006.01)

(52) U.S. Cl. .................. 369/47.53; 369/275.3

(58) Field of Classification Search .............. None
See application file for complete search history.

(56) References Cited

U.S. PATENT DOCUMENTS

| | | | | |
|---|---|---|---|---|
| 7,274,638 B2 * | 9/2007 | Lee et al. | ........... | 369/47.53 |
| 7,286,455 B2 * | 10/2007 | Shoji et al. | ........... | 369/47.53 |
| 7,376,058 B2 * | 5/2008 | Narumi et al. | ........... | 369/47.53 |
| 2003/0185121 A1 * | 10/2003 | Narumi et al. | ........... | 369/47.53 |
| 2005/0025013 A1 * | 2/2005 | Yamamoto | ........... | 369/47.53 |
| 2005/0030862 A1 | 2/2005 | Ninomiya | | |
| 2005/0036425 A1 | 2/2005 | Suh et al. | | |
| 2005/0226116 A1 | 10/2005 | Kubo et al. | | |
| 2007/0159942 A1 * | 7/2007 | Takeshita et al. | ........... | 369/47.53 |

FOREIGN PATENT DOCUMENTS

| | | |
|---|---|---|
| EP | 1244096 A2 | 9/2002 |
| EP | 1318509 A1 | 6/2003 |
| EP | 1492098 A2 | 12/2004 |
| EP | 1505597 A1 | 2/2005 |
| EP | 1 672 621 A1 | 6/2006 |

(Continued)

OTHER PUBLICATIONS

International Search Report issued Sep. 1, 2006 in corresponding International Patent Application No. PCT/KR2006/002564.

(Continued)

*Primary Examiner*—Peter Vincent Agustin
(74) *Attorney, Agent, or Firm*—Harness, Dickey & Pierce, P.L.C.

(57) ABSTRACT

A multi-layered recording medium, and a method and apparatus for recording data in the recording medium are disclosed. A multi-layered recording medium, each of which includes an inner area, a data area, and an outer area, includes: first layer having at least a test area assigned to the inner area; and second layer having at least a management area assigned to the inner area, wherein the test area in the first layer is not physically located at the same location as the management area assigned to the second layer adjacent to the first layer with respect to an incident beam.

18 Claims, 8 Drawing Sheets

FOREIGN PATENT DOCUMENTS

| | | |
|---|---|---|
| JP | 11-175980 | 7/1999 |
| WO | WO 03/023767 A2 | 3/2003 |
| WO | WO 03/063144 A2 | 7/2003 |
| WO | WO 2004/081937 A1 | 9/2004 |
| WO | WO 2004/086378 A1 | 10/2004 |
| WO | 2005/004134 A1 | 1/2005 |
| WO | 2005/004138 A1 | 1/2005 |
| WO | WO 2005/001824 A1 | 1/2005 |
| WO | WO 2005/001825 A1 | 1/2005 |
| WO | WO 2005/034110 A1 | 4/2005 |
| WO | WO 2007/004821 A1 | 1/2007 |

OTHER PUBLICATIONS

European Search Report dated Jul. 3, 2008.
Extended Search Report issued Jul. 2, 2008 by the European Patent Office in counterpart European Patent App. No. 06700249.3.
International Search Report issued Jul. 14, 2006 in counterpart International Patent Application No. PCT/KR2006/000043.
Office Action issued Mar. 6, 2009 by the USPTO in counterpart U.S. Appl. No. 11/328,069.

* cited by examiner

MULTI-LAYERED RECORDING MEDIUM, AND METHOD AND APPARATUS FOR RECORDING DATA

This application claims the benefit of Korean Patent Application No. 10-2005-0104345, filed on Nov. 2, 2005, which is hereby incorporated by reference as if fully set forth herein.

This application claims the benefit of U.S. Provisional Application No. 60/695,006, filed on Jun. 30, 2005, in the name of inventor Sang Woon SUH, entitled "LEAD-IN ZONE STRUCTURE OF MULTI-LAYER BD-R DISC", which is hereby incorporated by reference as if fully set forth herein.

BACKGROUND OF THE INVENTION

1. Field of the Invention

The present invention relates to a recording medium, and more particularly to a physical structure efficiently used when manufacturing the recording medium, and a method and apparatus for recording data in the recording medium using the physical structure.

2. Discussion of the Related Art

Generally, there has been widely used a disc acting as a recording medium capable of recording a large amount of data therein. Particularly, there has recently been developed a high-density optical recording medium capable of recording/ storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

However, a preferred physical structure for the BD, and a preferred data management method for use in the physical structure have not yet been established, such that many limitations and problems occur in developing a BD-based optical recording/reproducing device.

SUMMARY OF THE INVENTION

Accordingly, the present invention is directed to a recording medium, and a method and apparatus for recording data in the recording medium that substantially obviate one or more problems due to limitations and disadvantages of the related art.

An object of the present invention is to provide a new physical structure suitable for a recording medium, and a method and apparatus for recording data in the recording medium using the physical structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-layered recording medium, each of which includes an inner area, a data area, and an outer area, comprises: first layer having at least a test area assigned to the inner area; and second layer having at least a management area assigned to the inner area, wherein the test area in the first layer is not physically located at the same location as the management area assigned to the second layer adjacent to the first layer with respect to an incident beam.

In another aspect of the present invention, there is provided a method for recording data in a multi-layered recording medium comprising the steps of: a) testing a record power in a test area in first layer, and determining an optimum record power; and b) recording data at the determined optimum record power, and recording a control information according to the data recording in a management area assigned to second layer adjacent to the first layer, wherein the test area in the first area is not physically located at the same location as the management area in the second layer with respect to the incident beam.

In yet another aspect of the present invention, there is provided an apparatus for recording data in a recording medium comprising: a pickup unit for recording data in the recording medium; and a control unit for testing a record power in a test area of first layer contained in the recording medium, determining an optimum record power, recording data at the determined optimum record power, and recording a control information according to the data recording in a management area assigned to second layer adjacent to the first layer, wherein the test area in the first layer is not physically located at the same location as the management area in the second layer with respect to the incident beam.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A recording medium, and a method and apparatus for recording data in the recording medium according to the present invention will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

The term "recording medium" for use in the present invention indicates all mediums capable of storing data therein according to various recording schemes. Representative examples of the recording medium are an disc, and a magnetic tape, etc.

For the convenience of description and better understanding of the present invention, the disc, such as a BD-R, will hereinafter be exemplarily used as the above-mentioned recording medium in the present invention. It should be noted that technical ideas of the present invention can be applied to other recording mediums without departing from the scope and spirit of the invention.

The term "Optimum Power Control (OPC) area" acting as an exemplary test area is indicative of a area assigned to perform an OPC process in the recording medium. The term "Optimum Power Control (OPC)" is indicative of a process capable of calculating an optimum record power when recording data in a recordable disc.

In other words, if the disc is seated in a specific optical recording/reproducing device, the optical recording/reproducing device repeatedly performs a process for recording data in the OPC area of the disc, and reproducing the recorded data, such that it calculates an optimum record power applicable to the disc. Thereafter, the optical recording/reproducing device uses the calculated optimum record power when recording data in the disc. Therefore, the OPC area is required for the recordable disc.

In association with the above-mentioned description, a TDMA (Temporary Disc Management Area) is an example of a management area. For example, the BD-R must update current disc use states (e.g., a disc record state or defects generated by the data recording/reproducing process), and must reflect the updated information. For this purpose, the TDMA is used during the disc use time. A control information included in the TDMA includes information related to a recording layer in which TDMA is recorded and other recording layers.

The term "Multi-layer" is indicative of at least two layers. Specifically, if a multi-layer includes only two layers, this configuration is referred to as a dual-layer. The multi-layer has different physical characteristics according to each layer, such that each layer require their unique OPC areas.

Specifically, the present invention can be effectively used for the multi-layered disc composed of at least three layers.

In this case, although there are three layers in the above-mentioned disc, i.e., a cover layer, a spacer layer, and a recording layer, it is assumed that the present invention is limited to the recording layer for the convenience of description, such that the recording layer is referred to as a layer, and the single-layered disc and the multi-layered disc are distinguished from each other according to the number of the recording layers.

A recording medium, and a method and apparatus for recording data in the recording medium will hereinafter be described with reference to the annexed drawings.

The present invention relates to an inner area of a multi-layered disc. For example, if N layers are contained in the disc, the layers are sequentially arranged in the order of a first layer (Layer 0, "L0"), a second layer (layer 1, "L1"), , , , an N-th layer (Layer N-1, "Ln-1") on the basis of a specific layer mostly distant from an incident direction of an optical beam. Needless to say, the above-mentioned layers may also be sequentially arranged on the basis of a specific layer closest to the optical beam incident direction, and the scope of the present invention is not limited to the above-mentioned examples.

In association with the above-mentioned description, although the number of layers contained in the disc is not limited to a specific number, it is preferable that the maximum number of layers allowable in a single disc is about 8 considering that a disc thickness (t) is typically set to 1.2 mm.

Referring to a cross-sectional view of the disc, each layer (L0, L1, . . . , or Ln-1) of the disc may be classified into an inner area, a data area, and an outer area on the basis of a disc inner area.

A specific area contained in each of the inner area and the outer area is used as either a record area for recording disc management information (DMI) or a test area. The data area records actual user data therein.

In this case, a spare area for the disc management may also be contained in the above-mentioned data area.

The present invention relates to a recordable recording medium, such that the OPC area is contained in each of all layers contained in the disc, and OPC areas of adjacent layers (or neighboring layers) are not physically located at the same locations on the basis of a proceeding direction of the optical beam.

In other words, in order to perform the OPC process, a power value for the test is sequentially used in the range from a high power value to a low power value or alternatively. If the OPC area is physically located at the same location on the basis of the optical beam proceeding direction between the neighboring layers, the probability of encountering an beam interference capable of occurring in not only a really-used OPC area but also other OPC areas contained in the neighboring layers is increased.

From the viewpoint of the purposes of the OPC area capable of calculating the optimum record power, the increasing probability of the beam interference may have a negative influence upon the calculation of the optimum record power.

Therefore, it is assumed that the present invention includes zigzag-configured OPC areas according to the purposes of the OPC areas, and the TDMA location capable of being affected by the OPC result may be established in consideration of the OPC-area location.

Figure 1:
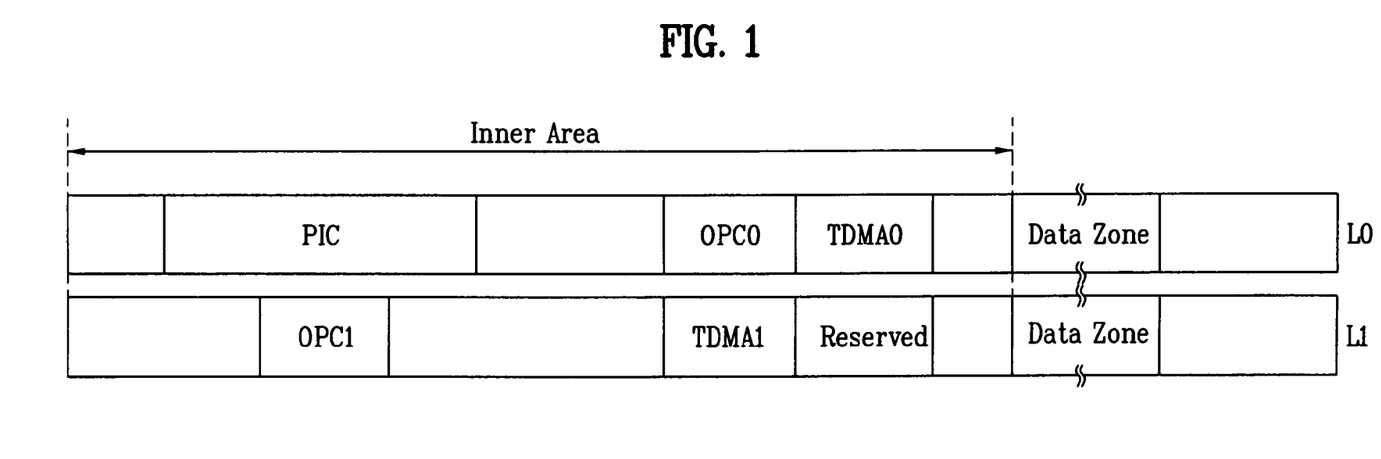
FIG. 1 is a dual-layered BD-R according to the present invention.
Figure 2:
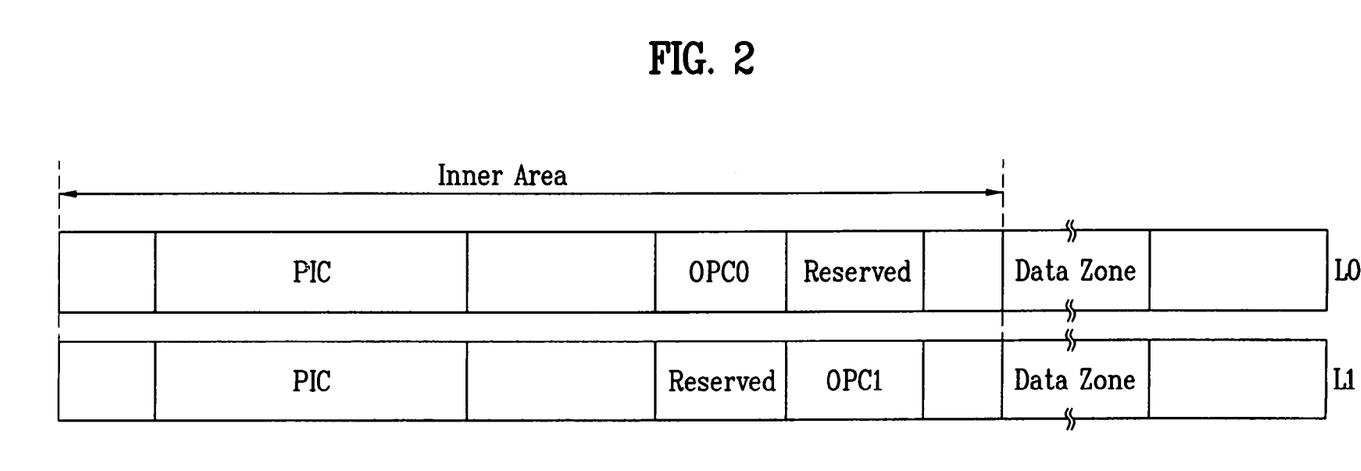
FIG. 2 is a dual-layered BD-RE according to the present invention.

FIG. 1 is a dual-layered BD-R according to the present invention. FIG. 2 is a dual-layered BD-RE according to the present invention.

FIGS. 1~2 show the dual-layered discs. Specifically, individual inner areas of the BD-R and BD-RE from among a plurality of areas of each layer of the disc will hereinafter be described with reference to FIGS. 1~2.

A detailed description of the inner area will hereinafter be described. The inner area includes a PIC (Permanent Information & Control data) area, an OPC area for performing the OPC process. The PIC area records disc management information as an embossed HFM (High Frequency Modulated) signal.

In association with the above-mentioned description, a write-once BD-R further includes a Temporary Disc Management Area (TDMA) adjacent to the OPC area, but a BD-RE includes a reserved area in the vicinity of the OPC area.

Referring to the inner area of the BD-R of FIG. 1, a PIC area, an OPC0 area, and a TDMA0 area are sequentially contained in the layer L0. An OPC1 area, a TDMA1 area, and a reserved area are contained in the layer L1.

Referring to the inner area of the BD-RE of FIG. 2, a PIC area, an OPC0 area, and a reserved area are sequentially contained in the layer "L0". A PIC area, a reserved area, and an OPC1 area are contained in the layer "L1".

As described above, the inner area of the BD-R of FIG. 1 is different from that of the BD-RE of FIG. 2, and the reason why the inner area of the BD-R is different from that of the BD-RE is as follows.

Firstly, the BD-R acts as a write-once recording medium, such that data can be recorded in the BD-R only one time. In other words, the disc management scheme and the defect management scheme of the BD-RE are different from those of the BD-R.

In association with the above-mentioned disc management scheme, there is no need for the inner area of the BD-RE to include the TDMA, but there is a need for the inner area of the BD-R to include the TDMA for the disc management required for the data record process. Therefore, the inner area of the BD-R to which the TDMA is assigned is different from that of the BD-RE to which no TDMA is assigned.

Secondly, the OPC area is assigned to the inner area. In more detail, the BD-RE does not include a specific area (e.g., a TDMA) to which data capable of being affected by the OPC result of the OPC area is recorded, such that no problem occurs in the BD-RE.

However, the BD-R includes the TDMA capable of being affected by the OPC result, such that the OPC area and the TDMA contained in each layer must be assigned at different locations to prevent the occurrence of a negative influence caused by the arrangement of the OPC area and the TDMA. As a result, the inner area of the BD-RE must be designed to be different from that of the BD-R.

In association with the above-mentioned description, the present invention provides an improved inner area structure for preventing data stored in the TDMA from being damaged by the OPC result of the neighboring layers in the multi-layered disc, such that it can effectively use the disc.

Referring to the inner area structure of the layers L0 and L1 of the BD-RE shown in FIG. 2, at least one OPC area is contained in each layer, and the OPC0 area and the OPC1 area are physically located at different locations with respect to the incident beam. As a result, the OPC result between the OPC0 area and the OPC1 area, i.e., a Hi-power Recording effect, may have no influence upon the neighboring layer.

Referring to the inner area structure of the layers L0 and L1 of the BD-R shown in FIG. 1, the OPC1 area of the layer L1 is located at the same location as the PIC area of the layer L0 with respect to the incident beam.

In this case, no data is recorded in the PIC area, and the PIC area is configured in the form of a wobbled shape, such that the PIC area is not affected by the OPC result of the OPC area of the layer L1.

A TDMA for recording disc management information and other data therein is located at the same location as the OPC1 area of the layer L0 with respect to the incident beam, such that the OPC result of the OPC0 area may affect the TDMA1.

The above-mentioned situation indicates that the OPC result may unavoidably deteriorate RF-signal jitters of each layer. Therefore, it is desirable that important RF-format data may not be recorded in the layers of the BD-R.

Although the dual-layered disc has been disclosed in FIG. 1, it should be noted that the maximum number of layers allowable in a single disc (such as a BD) may be determined to be about "8".

An inner area structure capable of effectively employing the disc will hereinafter be described with reference to FIGS. 3~7.

The present invention is characterized in that the OPC area and the TDMA are not physically located at the same location with respect to the incident beam so as to prevent TDMA data from being damaged by the OPC result.

If the OPC area is located at the same location as the TDMA, the OPC result may affect data of the TDMA, such that unexpected defects occur in the disc management information, resulting in the occurrence of problems in data recording/reproducing operations of the disc.

Therefore, the OPC area and the TDMA of each layer must not be physically located at the same locations with respect to the incident beam. In this case, there is no need for each TDMA of each layer to be located at the same location. For the convenience of description, it is assumed that the each TDMA of each layer are located at the same location.

Figure 3:
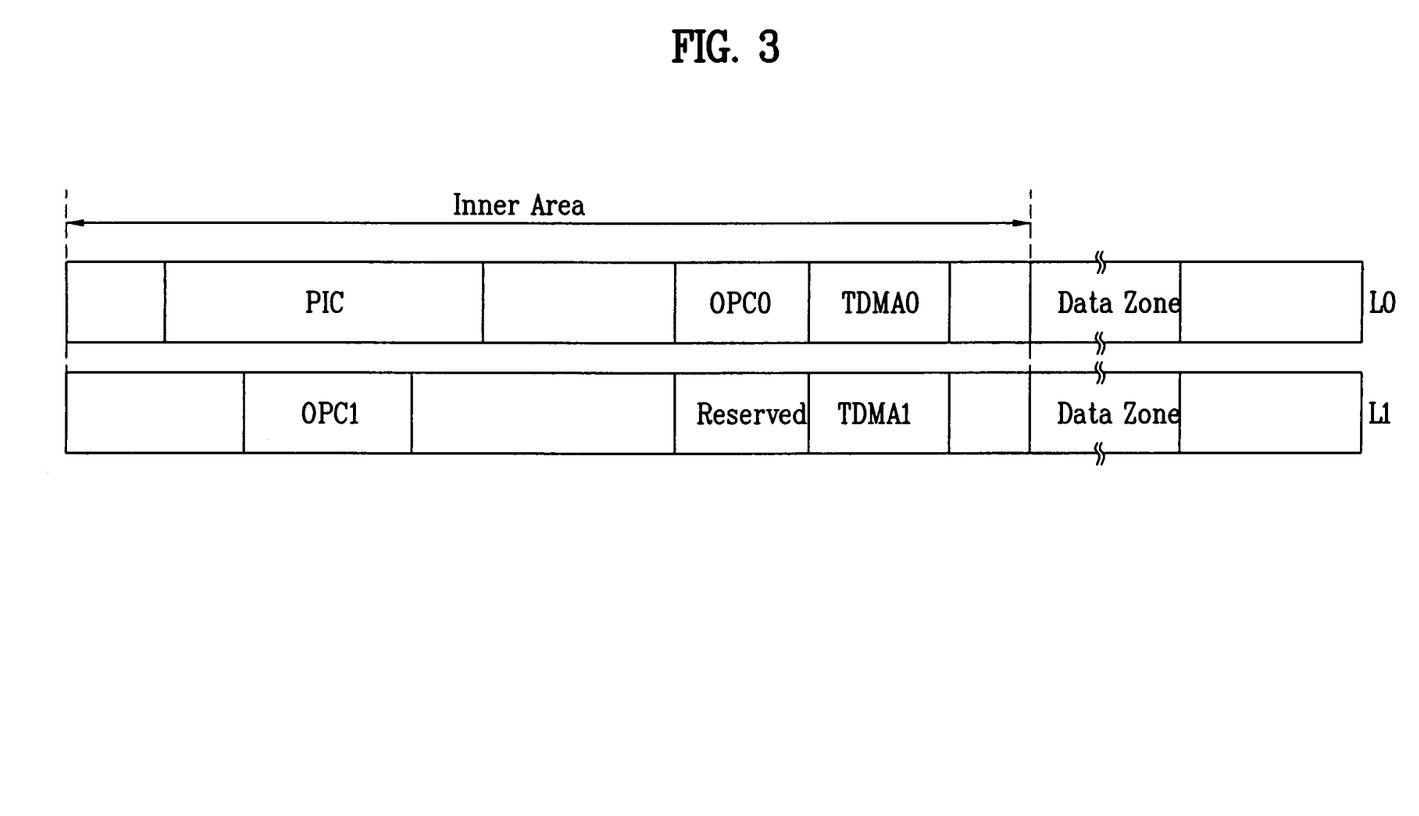
FIG. 3 is a structural diagram illustrating a disc inner area according to a first preferred embodiment of the present invention.

FIG. 3 is a structural diagram illustrating a disc inner area according to a first preferred embodiment of the present invention. FIG. 3 shows a dual-layered disc. As can be seen from FIG. 3, an inner area of the layer L0 sequentially includes a PIC area, an OPC area, and a TDMA0 area on the basis of the disc inner area. An inner area of the layer L1 sequentially includes an OPC1 area, a reserved area, and a TDMA1 on the basis of the disc inner area.

The OPC result of the OPC1 area from among the inner area of the layer L1 may have almost no influence upon the PIC area of the layer L0.

However, the OPC result of the OPC0 area from among the inner area of the layer L0 may affect the TDMA1 of the layer L1. Therefore, the disc of the present invention comprises the TDMA not to be physically located at the same location as the OPC0 area with respect to the incident beam. Therefore, a reserved area, instead of the TDMA1, is physically located at the same location as the OPC0 area with respect to the incident beam, such that data is not recorded in the reserved area, and the disc is not affected by the OPC result.

Therefore, in the case of the inner area structure (See FIG. 3) according to the present invention, the TDMA0 and the TDMA1 of each layer L0 and L1 are physically located at the same location with respect to the incident beam, and a reserved area is physically located at the same location as the OPC area with respect to the incident beam.

Figure 4:
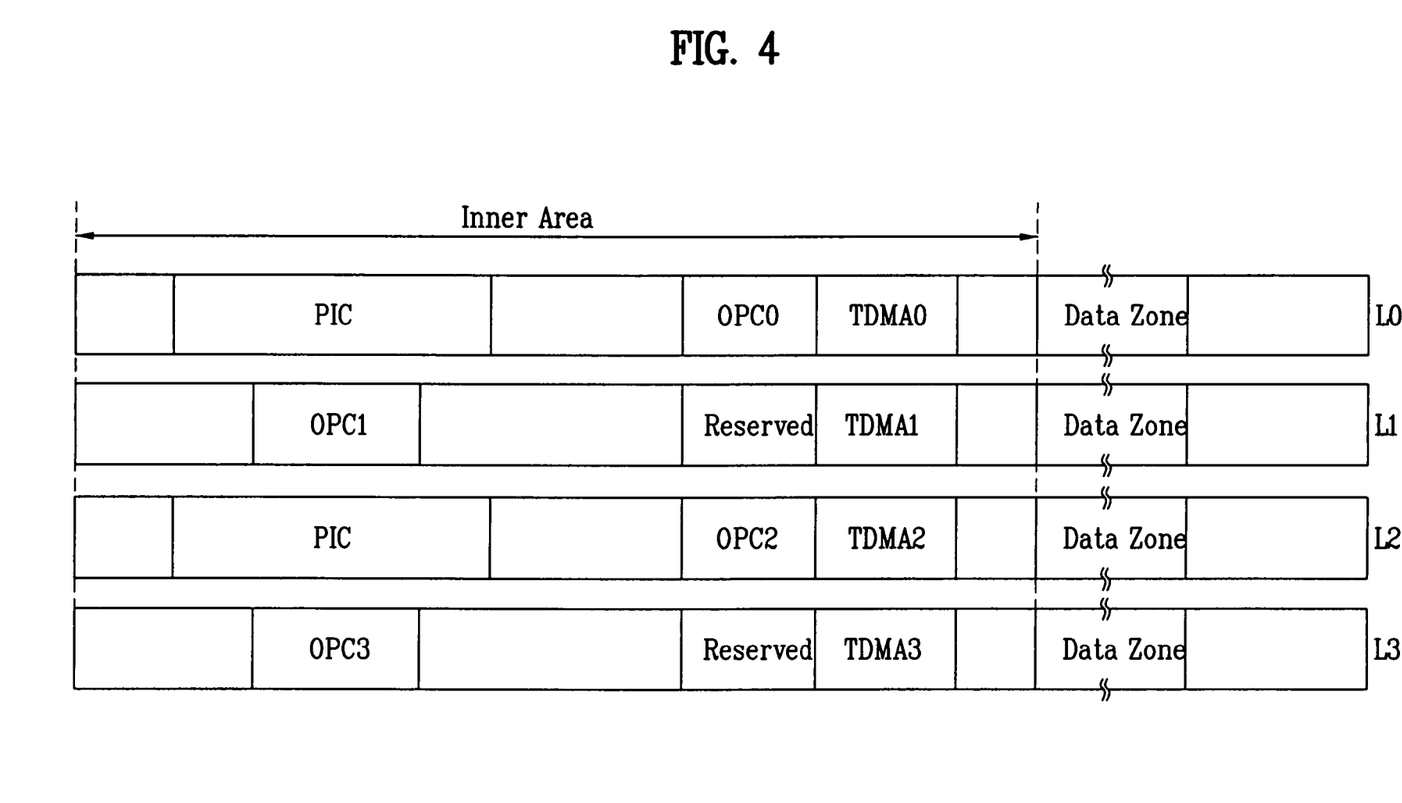
FIG. 4 is a structural diagram illustrating a disc inner area according to a second preferred embodiment of the present invention.

FIG. 4 is a structural diagram illustrating a disc inner area according to a second preferred embodiment of the present invention. The concept of FIG. 3 is extended to the configuration of FIG. 4. FIG. 4 exemplarily shows an inner area structure of the disc composed of 4 layers.

Referring to the above-mentioned inner area structure of FIG. 4, the layers L0 and L1 have the same inner areas as those of the dual-layered disc of FIG. 3. Also, the layers L2 and L3 are equal to the layers L0 and L1. The structure of FIG. 4 is formed by repetition of the inner area of the dual-layered disc of FIG. 3.

Therefore, the inner area of the layer L0 sequentially includes a PIC area, an OPC0 area, and a TDMA0. The inner area of the layer L1 sequentially includes an OPC1 area, a reserved area, and a TDMA1. The inner area of the layer L2 sequentially includes a PIC area, an OPC2 area, and a TDMA2. The inner area of the layer L3 sequentially includes an OPC3 area, a reserved area, and a TDMA3.

In this case, the OPC result of the OPC1 area, and the OPC result of the OPC3 area have almost no influence upon the disc, because the PIC area of the layer L0 and the PIC area of the layer L2 are embossed in the form of wobbles.

However, the OPC result of the OPC0 area of the layer L0 and the OPC result of the OPC2 area of the layer L2 affect individual neighboring layers located at the same locations with respect to the incident beam. In other words, the OPC result of the OPC0 area affects the layer L1, and the OPC result of the OPC2 area affects the layer L1 or L3.

Therefore, in order to minimize the influence caused by the above-mentioned OPC results of the OPC0 area and the OPC2 area, the TDMA1 and the TDMA3 are not physically located at the same locations as the OPC0 and OPC2 areas with respect to the incident beam, and the reserved areas having no data are physically located at the same locations as the OPC0 and OPC2 areas, such that the influence of the OPC result may be minimized.

In this case, if each TDMA is arranged as mentioned above, an overall inner area structure shown in FIG. 4 is extended to the layers L0~L3, the TDMAs of each layer L0~L3 are physically located at the same location with respect to the incident beam, and the reserved areas are physically located at the same location as the OPC areas with respect to the incident beam, such that the OPC areas and the reserved areas are alternately arranged in the layers L0~L3. Therefore, the disc is not affected by the OPC results of the OPC areas, such that the disc can be more effectively used.

Figure 5:
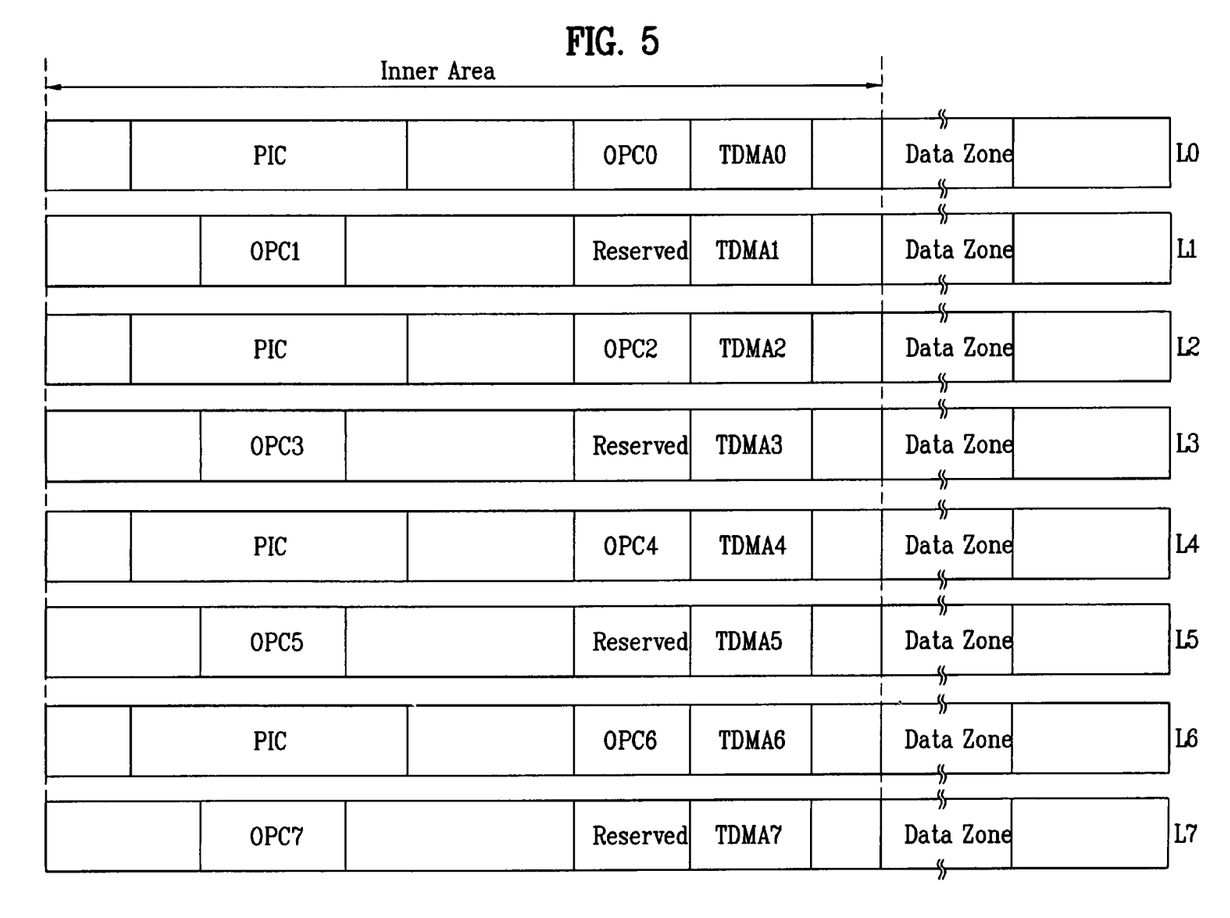
FIG. 5 is a structural diagram illustrating a disc inner area according to a third preferred embodiment of the present invention.

FIG. 5 is a structural diagram illustrating a disc inner area according to a third preferred embodiment of the present invention. As previously mentioned above, a maximum of 8 layers may be contained in a single disc. FIG. 5 exemplarily shows an inner area structure when 8 layers are contained in the single disc.

In more detail, FIG. 5 exemplarily shows an 8-layered disc formed by the extension of the dual-layered disc of FIG. 3 and the 4-layered disc of FIG. 4.

The L0 and L1 structures of FIG. 5 are equal to those of the inner areas of the dual-layered disc shown in FIG. 3. The L2 and L3 structures of FIG. 5 are equal to those of the L0 and L1 structures of FIG. 4. In more detail, the structure of FIG. 5 is formed by repetition of the inner area of the dual-layered disc of FIG. 3.

Therefore, the inner area of the layer L0 sequentially includes a PIC area, an OPC0 area, and a TDMA0. The inner area of the layer L2 sequentially includes a PIC area, an OPC2 area, and a TDMA2. The inner area of the layer L4 sequentially includes a PIC area, an OPC4 area, and a TDMA4. The inner area of the layer L6 sequentially includes a PIC area, an OPC6 area, and a TDMA6. The inner area of the layer L1 sequentially includes an OPC1 area, a reserved area, and a TDMA1. The inner area of the layer L3 sequentially includes an OPC3 area, a reserved area, and a TDMA3. The inner area of the layer L5 sequentially includes an OPC5 area, a reserved area, and a TDMA5. The inner area of the layer L7 sequentially includes an OPC7 area, a reserved area, and a TDMA7.

The access sequences of the OPC areas and the TDMAs are sequentially determined in the range from the layer L0 to the layer L7.

The PIC areas contained in the layers L0, L2, L4, and L6 of FIG. 5 are not affected by the OPC results of the OPC areas (i.e., OPC1, OPC3, OPC5, and OPC7 areas) contained in the layers L1, L3, L5, and L7 adjacent to the layers L0, L2, L4, and L6.

However, the TDMA including the disc management information in each layer is affected by the above-mentioned OPC result. In other words, the OPC result of the OPC0 area of the layer L0 affects the layer L1, and the OPC result of the OPC2 area of the layer L2 affects the layers L1 and L3. Also, the OPC result of the OPC4 area in the layer L4 affects the layers L3 and L5, and the other OPC result of the OPC6 area in the layer L6 affects the layers L5 and L7.

In order to minimize the negative influence upon the adjacent layers caused by the above-mentioned OPC results, the OPC areas of the present invention are not physically located at the same locations as the TDMAs with respect to the incident beam.

In this case, it is preferable that the TDMAs of each layer of the disc shown in FIG. 5 are physically located at the same location with respect to the incident beam.

Reserved areas, instead of a data record area capable of being affected by the OPC result, may be physically located at the same locations as the OPC2 area, the OPC4 area, and the OPC6 area with respect to the incident beam.

Therefore, the above-mentioned inner area structure according to the present invention prevents the occurrence of problems caused by the OPC results, resulting in increased efficiency of the disc.

Figure 6:
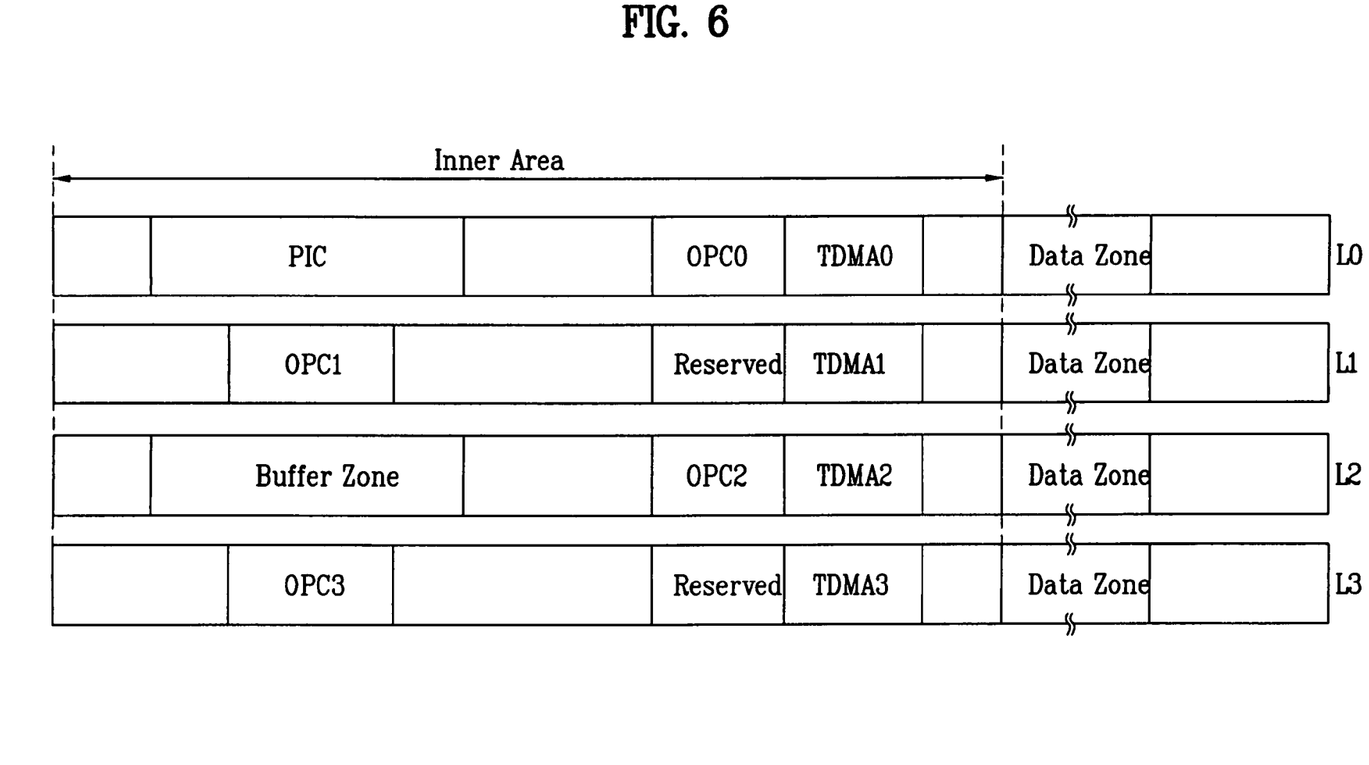
FIG. 6 is a structural diagram illustrating a disc inner area according to a fourth preferred embodiment of the present invention.
Figure 7:
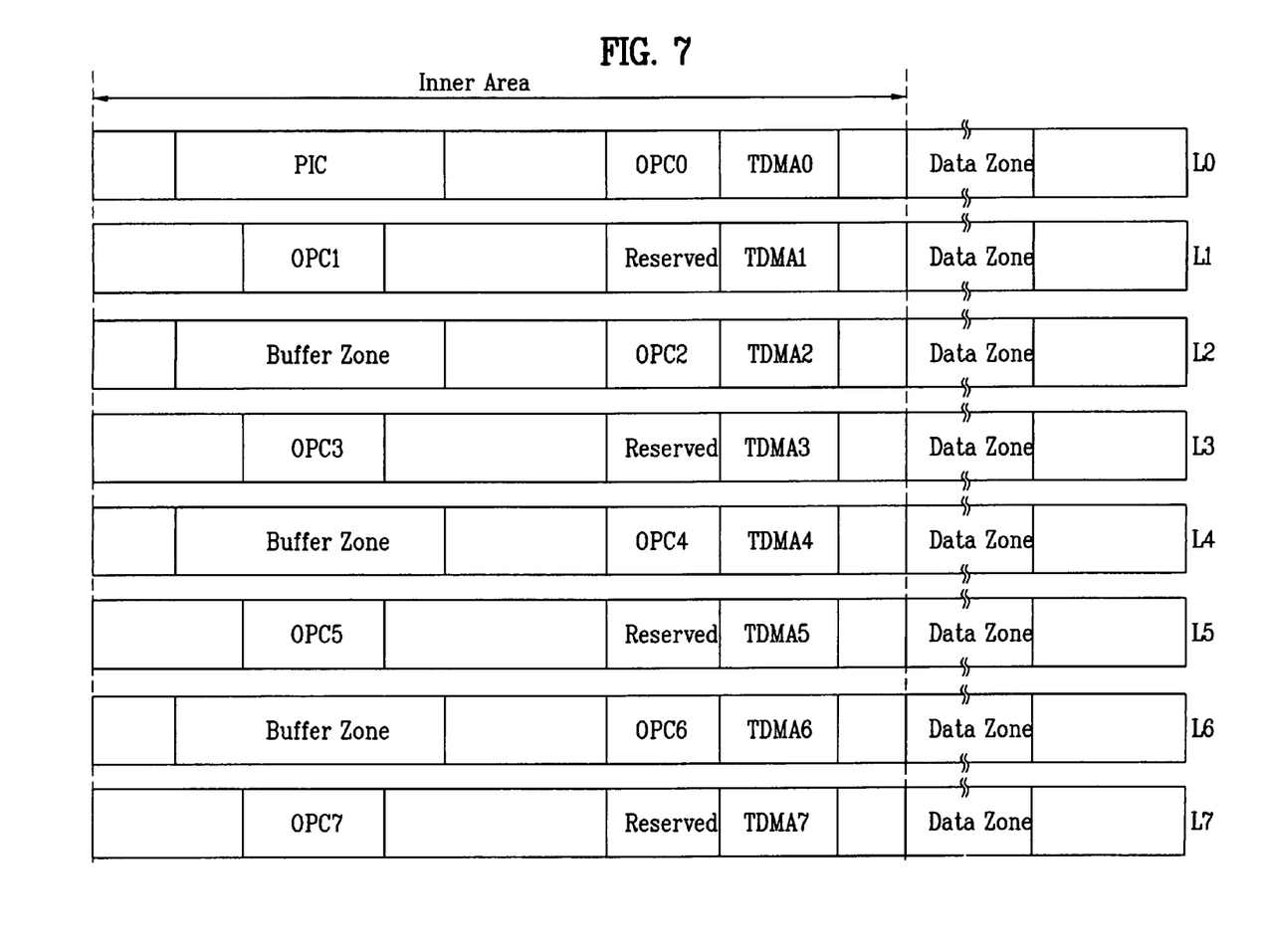
FIG. 7 is a structural diagram illustrating a disc inner area according to a fifth preferred embodiment of the present invention.

FIG. 6 is a structural diagram illustrating a disc inner area according to a fourth preferred embodiment of the present invention. FIG. 7 is a structural diagram illustrating a disc inner area according to a fifth preferred embodiment of the present invention.

FIGS. 6~7 show the conceptual and structural diagrams of the discs shown in FIGS. 3 to 5. FIG. 6 is an example of an inner area structure of a 4-layered disc. FIG. 7 is an example of an inner area structure of an 8-layered disc.

In other words, since data units stored in a plurality of PIC areas contained in the discs of FIGS. 4~5 are equal to each other, FIGS. 6~7 show examples of disc inner areas (e.g., buffer zones) replaced with unrecorded areas (i.e., areas incapable of recording data therein), excepting the PIC area contained in the initial layer of the disc composed of a plurality of layers.

The structure of FIG. 6 is basically equal to that of FIG. 4. As can be seen from FIG. 6, the PIC area is replaced with a buffer zone in the layer L2.

The structure of FIG. 7 is basically equal to that of FIG. 5. As can be seen from FIG. 7, the PIC areas are replaced with the buffer zones in the layers L2, L4, and L6 with respect to the incident beam.

The above-mentioned disc inner area structures of FIGS. 3~7 describe a variety of preferred embodiments of the present invention. Although the inner area structure is changed to another structure, the changed structure is not affected by the OPC result due to the TDMA capable of recording the disc management information therein, such that the scope and design of the present invention is not limited to the above-mentioned examples, and can also be applied to other examples as necessary.

Figure 8:
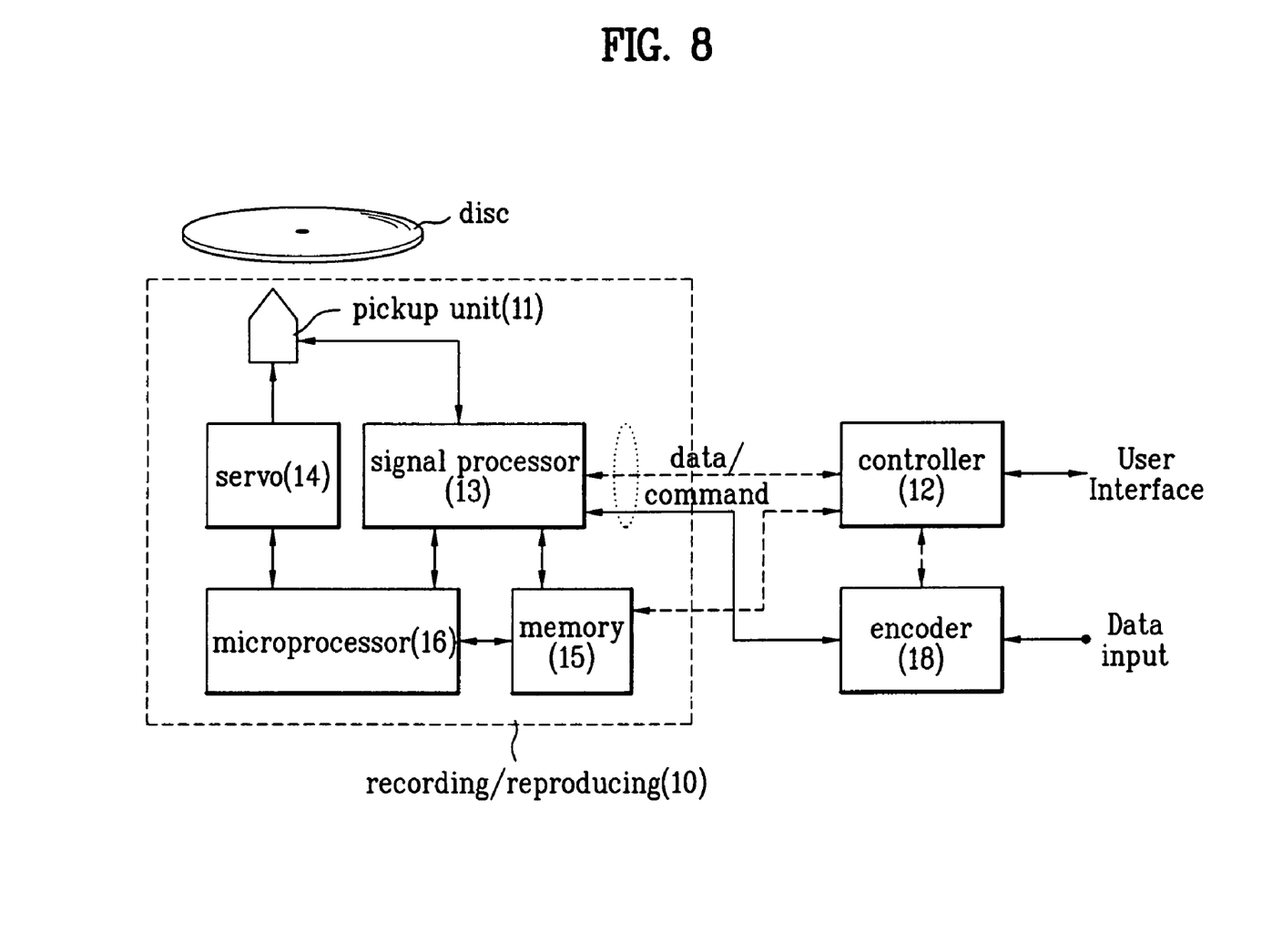
FIG. 8 is a block diagram illustrating an apparatus for recording data in a recording medium according to the present invention.

FIG. 8 is a block diagram illustrating an apparatus for recording data in a recording medium according to the present invention.

Referring to FIG. 8, an apparatus for recording data in a recording medium includes a recording/reproducing unit 10 for recording/reproducing data in/from a disc, and a controller 12 for controlling the recording/reproducing unit 10.

The recording/reproducing unit 10 includes a pickup unit 11, a signal processor 13, a servo unit 14, a memory 15, and a microprocessor 16. The pickup unit 11 directly records data in the disc, or reads data recorded in the disc. The signal processor 13 receives a signal read from the pickup unit 11, restores the received signal to a desired signal value, or modulates a signal to be recorded into another signal recorded in the disc, such that it transmits the recovered or modulated result. The servo unit 14 controls operations of the pickup unit 11, such that it correctly reads a desired signal from the disc, and correctly records the signal in the disc. The memory 15 temporarily stores not only management information but also data. The microprocessor 16 controls overall operations of the above-mentioned components.

The above-mentioned recording/reproducing unit 10 performs a test in a test area of a recording medium, calculates an optimum record power, and records data using the calculated optimum record power.

In association with the above-mentioned description, the recording device composed of only the recording/reproducing unit 10 is referred to as a driver, and is generally used as a peripheral device of a computer.

The controller 12 controls operations of overall constituent components. In association with the present invention, the controller 12 refers to a user command by interfacing with a user, and transmits a recording/reproducing command capable of recording/reproducing data in/from the disc to the recording/reproducing unit 10.

The microprocessor 16 performs a test associated with the record power in the test area of the first layer, calculates an optimum record power, and records data using the calculated optimum record power, such that it records a control information (e.g., disc management information) according to the data recording process in the management area assigned the second layer adjacent to the first layer. In this case, the test area in the first layer is not physically located at the same location as the management area in the second with respect to the incident beam.

In association with the preset invention, the functions of the controller 12 and the microprocessor 16 can be separated and operated by a first control unit and a second control unit, respectively. Alternatively, the functions of the controller 12 and the microprocessor 16 can be combined and operated as a single control unit.

The decoder 17 decodes a signal read from the disc upon receiving a control signal from the controller 12, restores the decoded signal to desired information, and transmits the restored signal to the user.

The encoder 18 receives a control signal from the controller 12 to record a desired signal in the disc, converts the received signal into a specific-format signal (e.g., an MPEG2 transport stream), and transmits the specific-format signal to the signal processor 13.

A method for recording data in a multi-layered recording medium using the apparatus shown in FIG. 8 will hereinafter be described with reference to FIG. 9.

Figure 9:
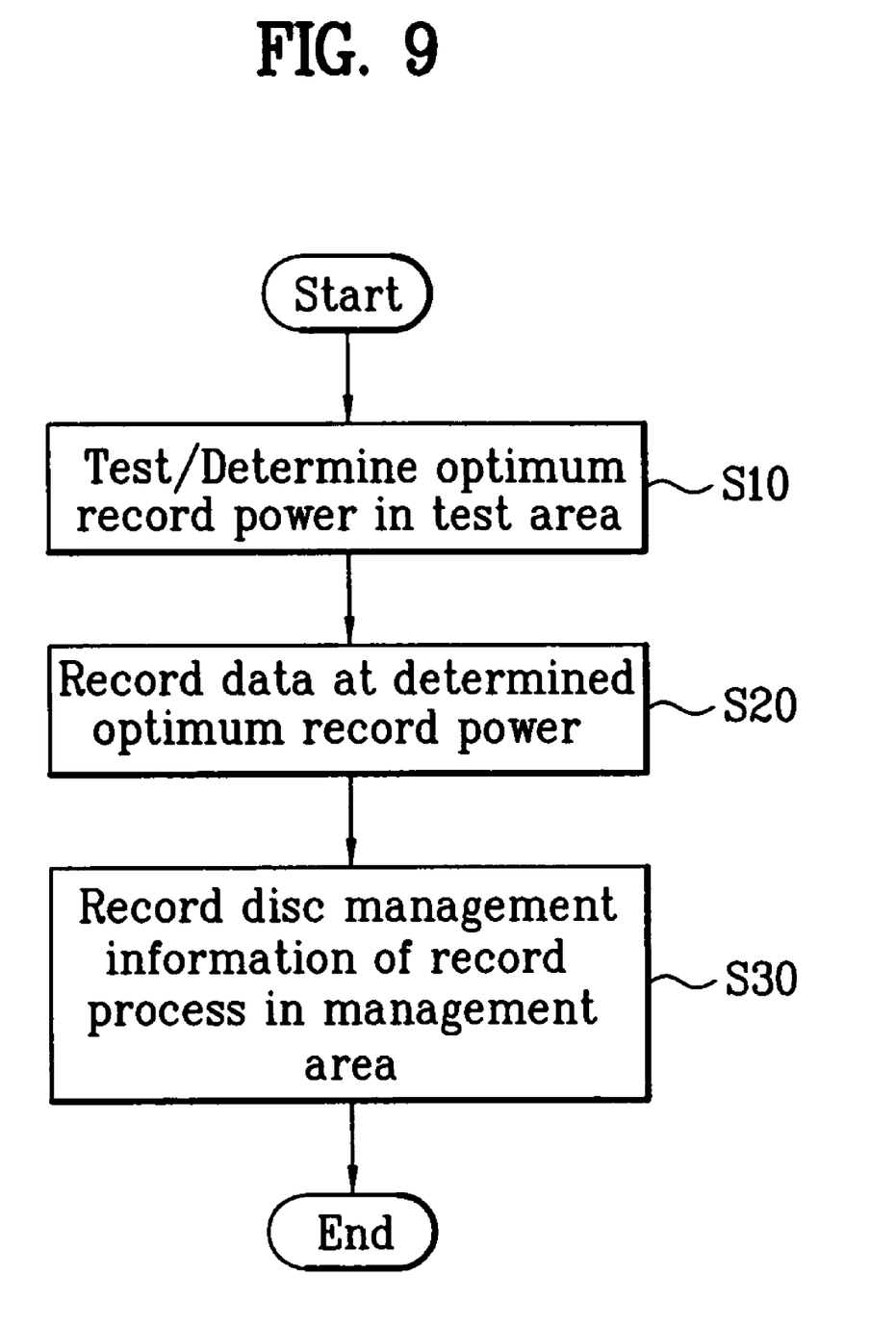
FIG. 9 is a flow chart illustrating a method for recording data in a recording medium according to the present invention.

FIG. 9 is a flow chart illustrating a method for recording data in a recording medium according to the present invention.

Referring to FIG. 9, an optimum record power for recording data in a recording medium must firstly be calculated to record data in a multi-layered recording medium. For this operation, a record power of the OPC area is tested, such that the optimum record power is determined at step S10.

Then, the apparatus for recording data records data using the determined optimum record power of the recording medium at step S20.

If the data recording operation of the above-mentioned recording medium begins, the apparatus for recording data records disc management information (DMI) and other data in the TDMA generated by the record process in the TDMA at the above-mentioned determined optimum record power.

In this case, the OPC areas of each layer are not physically located at the same locations as the TDMAs of neighboring layers adjacent to the above-mentioned layers including the OPC areas with respect to the incident beam.

For example, in the case of the 8-layered recording medium, the OPC area exists in the layer L5, the TDMAs of the layers L4 and L6 are not physically located at the same locations as the OPC area of the layer L5 with respect to the incident beam at step S30, such that the TDMAs of the layers L4 and L6 are not affected by the OPC result executed by the OPC area.

As apparent from the above description, a recording medium, and a method and apparatus for recording data in the recording medium according to the present invention can be applied to a method for manufacturing a recently-developed multi-layered BD, and can effectively record/reproduce data in/from the disc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A multi-layered recording medium, each of which includes an inner area, a data area, and an outer area, comprising:
    a first layer having at least a first test area and a control information area assigned to the inner area, said control information area being embossed in the form of wobbles; and
    a second layer having at least a second test area and a management area assigned to the inner area,
    wherein the test area in the first layer is not physically located at the same location as the management area assigned to the second layer adjacent to the first layer with respect to an incident beam, and the control information area is physically located at the same location partially or entirely as the second test area in the second layer with respect to the incident beam.

2. The recording medium according to claim 1, wherein the first and second test areas are an Optimum Power Control (OPC) area for each layer.

3. The recording medium according to claim 2, wherein the first test area assigned to the first layer is not physically located at the same locations as the second test area of the second layer with respect to the incident beam.

4. The recording medium according to claim 1, wherein the management area is a Temporary Disc Management Area (TDMA) in a write-once type of recording layer.

5. The recording medium according to claim 4, wherein all the TDMAs assigned to each layer are physically located at the same locations with respect to the incident beam.

6. The recording medium according to claim 1, wherein the data area for recording data in the second area is not physically located at the same location as the first test area in the first layer with respect to the incident beam.

7. The recording medium according to claim 1, wherein a reserved area in the second layer is physically located at the same location as the first test area in the first layer with respect to the incident beam.

8. The recording medium according to claim 1, wherein a buffer zone in the second layer is physically located at the same location partially or entirely as the second test area in the first layer with respect to the incident beam.

9. The recording medium according to claim 1, wherein the recording medium is a write-once Blu-ray Disc Recordable (BD-R).

10. A method for recording data in a multi-layered recording medium comprising:
   a) testing a record power in a first test area in a first layer or a second test area in a second layer, and determining an optimum record power; and
   b) recording data at the determined optimum record power, and recording a control information according to the data recording in a management area assigned to the first layer and/or a second layer adjacent to the first layer,
   wherein the first test area in the first layer is not physically located at the same location as the management area in the second layer with respect to an incident beam, a control data area embossed in the form of wobbles in the first layer is physically located at the same location partially or entirely as the second test area in the second layer with respect to the incident beam.

11. The method according to claim 10, wherein the first and second test areas are an Optimum Power Control (OPC) area to record a test data in order to determine the optical record power, and
   wherein the testing step includes recording the test data in the first or second test areas.

12. The method according to claim 10, wherein the management area is a Temporary Disc Management Area (TDMA) in a write-once type of recording layer, and
   wherein the recording step records a temporary control information in the TDMA.

13. An apparatus for recording data in a recording medium comprising:
   a pickup unit configured to record data in the recording medium: and
   a control unit configured to control the pickup unit to test a record power in a first test area of a first layer or a second test area of a second layer contained in the recording medium, to determine an optimum record power based on the test, to control the pickup unit to record data at the determined optimum record power, and to control the pickup unit to record a control information according to the data recording in a management area assigned to the first layer or the second layer adjacent to the first layer,
   wherein the first test area in the first layer is not physically located at the same location as the management area in the second layer with respect to an incident beam, a control data area embossed in the form of wobbles in the first layer is physically located at the same location partially or entirely as the second test area in the second layer with respect to the incident beam.

14. The apparatus according to claim 13, wherein the first and second test areas are an Optimum Power Control (OPC) area to record a test data in order to determine the optimum record power, and
   wherein the controller is configured to control the pickup unit to determine the optimum record power by recording the test data.

15. The apparatus according to claim 13, wherein the management area is a Temporary Disc Management Area (TDMA) in a write-once type of recording layer, and
   wherein the controller is configured to control the pickup unit to record temporary control information in the TDMA.

16. The apparatus according to claim 15, wherein each TDMA assigned to each layer is physically located at the same locations with respect to the incident beam, and
   wherein the controller is configured to control the pickup unit to record data in the TDMA of the first layer across the TDMA of the second layer.

17. The apparatus according to claim 13, wherein the controller is configured to control the pickup unit to read control data included in the control data area across the second test area with respect to the incident beam.

18. The apparatus according to claim 13, wherein the controller is configured to control the pickup unit to test the recording power in the first layer across a reserved area of the second layer.

* * * * *